UNITED STATES PATENT OFFICE.

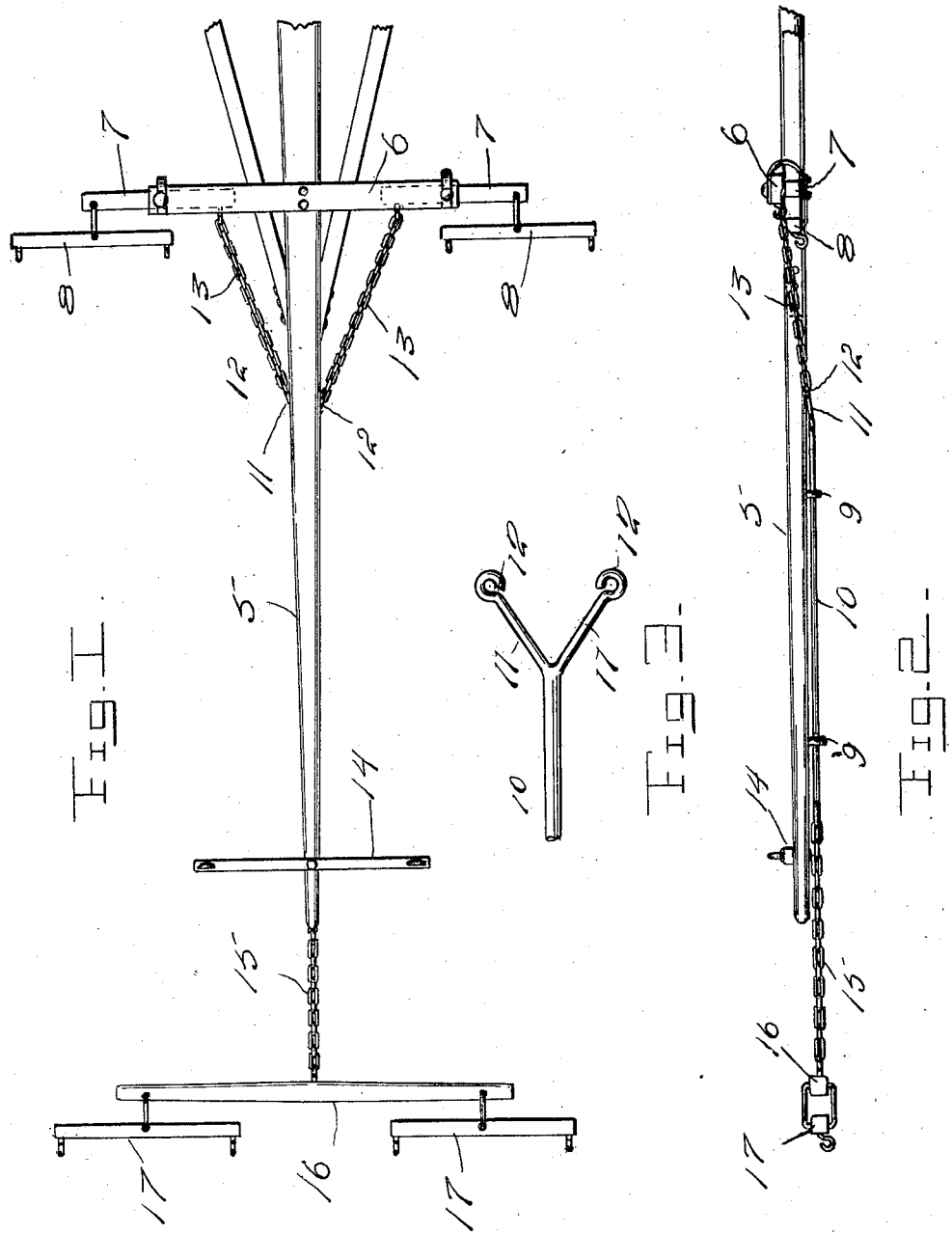

BEN R. TALBOT, OF HAZELTON, NORTH DAKOTA.

DRAFT-EQUALIZER.

No. 861,917.  Specification of Letters Patent.  Patented July 30, 1907.

Application filed March 28, 1906. Serial No. 308,495.

*To all whom it may concern:*

Be it known that I, BEN R. TALBOT, a citizen of the United States, residing at Hazelton, in the county of Emmons, State of North Dakota, have invented certain new and useful Improvements in Draft-Equalizers; and I do hereby declare the following to be a full, clear, and exact description of the invention, such as will enable others skilled in the art to which it appertains to make and use the same.

This invention relates to draft appliances for vehicles and more particularly to draft equalizers and has for its object to provide an equalizer including means for connecting four horses with the vehicle and means for equalizing the draft of all the animals.

Another object is to provide an equalizer which will be simple and which may be produced at a low figure.

Other objects and advantages will be apparent from the following description.

In the drawings forming a portion of this specification and in which like numerals of reference indicate similar parts in the several views, Figure 1 is a top plan, illustrating the present invention. Fig. 2 is a side elevation. Fig. 3 is a view showing the divergent fingers of the rod.

Referring now to the drawings, there is shown a wagon tongue 5 having pivotally mounted upon the rearward portion thereof, a transverse beam 6. Pivotally mounted beneath the outer ends of this beam and extending longitudinally thereof, there are a pair of members 7 having swingle-trees 8 connected with their outer ends. Depending brackets 9 are secured to the tongue in longitudinal alinement, and mounted in these brackets for sliding movement, there is a longitudinally extending rod 10. This rod has divergent fingers 11 at its rearward end which are provided with eyes 12 at their outer extremities, and engaged in these eyes, there are chains 13 which are connected with the inner ends of the members 7.

A neck yoke 14 is removably connected with the forward end of the tongue 5, and a forwardly extending chain 15 is connected with the rod 10 and with a double-tree 16 which extends transversely of the tongue at the forward end thereof. Swingle-trees 17 are connected with the double-tree 16, for the attachment of draft animals thereto.

It will thus be seen that one team of two horses may be hitched to the swingle-trees 17 and that another team of two horses may be hitched to the swingle-trees 8. It will be readily observed that the arrangement of parts is such that the draft of all horses equalizes.

It will be observed that the pivot points of the members 7 are located between the ends of the members, and that these members extend outwardly beyond the ends of the beam 6.

What is claimed is:

In a draft equalizer, the combination with a tongue, of a transverse beam pivotally mounted thereupon upon the rearward portion of the tongue, members pivoted between their ends beneath the beam at the ends thereof and extending longitudinally of the beam and outwardly therebeyond, depending brackets carried by the tongue in longitudinal alinement, a rod slidably engaged in the brackets for longitudinal movement, said rod having divergent fingers at its rearward end provided with eyes at their outer extremities, flexible connections engaged at one end in the eyes and connected at their other ends with the inner ends of the members, swingle-trees connected with the outer ends of the members, a neck yoke carried by the forward end of the tongue, a flexible connecting device secured to the forward end of the rod, a double-tree secured to the forward end of the connecting device, and swingle-trees carried by the ends of the double-tree.

In testimony whereof, I affix my signature, in presence of two witnesses.

BEN R. TALBOT.

Witnesses:
 L. H. BRIGGLE,
 AL. MIKALSON.